US008959533B2

United States Patent
VanBlon et al.

(10) Patent No.: US 8,959,533 B2
(45) Date of Patent: Feb. 17, 2015

(54) COMMUNICATING BETWEEN A FIRST OPERATING ENVIRONMENT AND A SECOND OPERATING ENVIRONMENT IN AN OPERATING SYSTEM

(71) Applicant: Lenovo (Singapore) PTE, Ltd., New Tech Park (SG)

(72) Inventors: Russell Speight VanBlon, Raleigh, NC (US); Ryan Patrick McShane, Raleigh, NC (US); Ratan Ray, Cary, NC (US); Shunqiang Xu, Nanshan District (CN)

(73) Assignee: Lenovo (Singapore) PTE. Ltd., Tech Park (SG)

( * ) Notice: Subject to any disclaimer, the term of this patent is extended or adjusted under 35 U.S.C. 154(b) by 18 days.

(21) Appl. No.: 13/648,448

(22) Filed: Oct. 10, 2012

(65) Prior Publication Data

US 2014/0101675 A1    Apr. 10, 2014

(51) Int. Cl.
  G06F 3/00 (2006.01)
  G06F 9/44 (2006.01)
  G06F 9/46 (2006.01)
  G06F 13/00 (2006.01)

(52) U.S. Cl.
  USPC ........................................................ 719/319

(58) Field of Classification Search
  None
  See application file for complete search history.

(56) References Cited

U.S. PATENT DOCUMENTS

| 4,414,620 | A  | * | 11/1983 | Tsuchimoto et al. | 709/217 |
| 2005/0125486 | A1 | * | 6/2005 | Chrysanthakopoulos et al. | 709/201 |
| 2010/0262672 | A1 | * | 10/2010 | Sugiyama | 709/208 |
| 2011/0113353 | A1 | * | 5/2011 | Koh et al. | 715/760 |
| 2012/0159517 | A1 | * | 6/2012 | Shen et al. | 719/318 |
| 2013/0124872 | A1 | * | 5/2013 | Shen et al. | 713/189 |

* cited by examiner

Primary Examiner — H S Sough
Assistant Examiner — William C Wood
(74) Attorney, Agent, or Firm — Kunzler Law Group

(57) ABSTRACT

An apparatus for communicating between a first operating environment and a second operating environment in an operating system includes a storage device storing machine-readable code and a processor executing the machine-readable code. The machine-readable code includes a receiving module receiving a request in a first operating environment from an application executing in a second operating environment. The first and second operating environments are provided by a common operating system. The request is communicated through a first communication path. The machine-readable code includes a response module sending a response from the first operating environment to the application in the second operating environment through a second communication path distinct from the first communication path.

20 Claims, 7 Drawing Sheets

COMMUNICATING BETWEEN A FIRST OPERATING ENVIRONMENT AND A SECOND OPERATING ENVIRONMENT IN AN OPERATING SYSTEM

BACKGROUND

1. Field

The subject matter disclosed herein relates to operating systems and more particularly relates to communicating between operating environments in an operating system.

2. Description of the Related Art

The proliferation of portable computing devices has led to an increase in applications and operating systems that offer functionality and user interfaces, such as touch interfaces, designed for these devices. For example, certain versions of the Windows® operating system from Microsoft®, caters to both desktop computers and portable computing devices.

These versions of Windows® may include two operating environments: an operating environment, referred to as "Modern UI" environment, with a-touch friendly, simplified user interface, and a "traditional" desktop environment. Each environment may have its own applications for execution in the respective environment.

BRIEF SUMMARY

Based on the foregoing discussion, the inventors have recognized a need for an apparatus, system, and method for communicating between a first operating environment and a second operating environment in an operating system. Beneficially, such an apparatus, system, and method would an application executing in the second operating environment to communicate with the first operating environment.

The embodiments of the present subject matter have been developed in response to the present state of the art, and in particular, in response to the problems and needs in the art that have not yet been fully solved by currently available operating systems. Accordingly, the embodiments have been developed to provide a method, apparatus, and system for inserting user targeted web resources into browser navigation memory.

An apparatus is provided that, in one embodiment, includes a storage device storing machine-readable code and a processor executing the machine-readable code. In one embodiment the machine-readable code includes a receiving module receiving a request in a first operating environment from an application executing in a second operating environment. The first and second operating environments may be provided by a common operating system. The request may be communicated through a first communication path. In one embodiment, the machine-readable code includes a response module sending a response from the first operating environment to the application in the second operating environment through a second communication path distinct from the first communication path.

A method is also presented, that in the disclosed embodiments, substantially includes the steps to carry out the functions presented above with respect to the operation of the described apparatus. In one embodiment, the method includes receiving a request in a first operating environment from an application executing in a second operating environment. The first and second operating environments may be provided by a common operating system. The request may be communicated through a first communication path. In one embodiment, the method includes sending a response from the first operating environment to the application in the second operating environment through a second communication path distinct from the first communication path.

A computer program product including a storage device storing machine readable code executed by a processor to perform operations is also presented. In one embodiment, the operations include determining whether a web resource is a user-targeted web resource. The web resource may be loaded in a web browser. In one embodiment, the operations include inserting a record of the web resource into navigation memory of the web browser in response to determining that the web resource is a user-targeted web resource.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
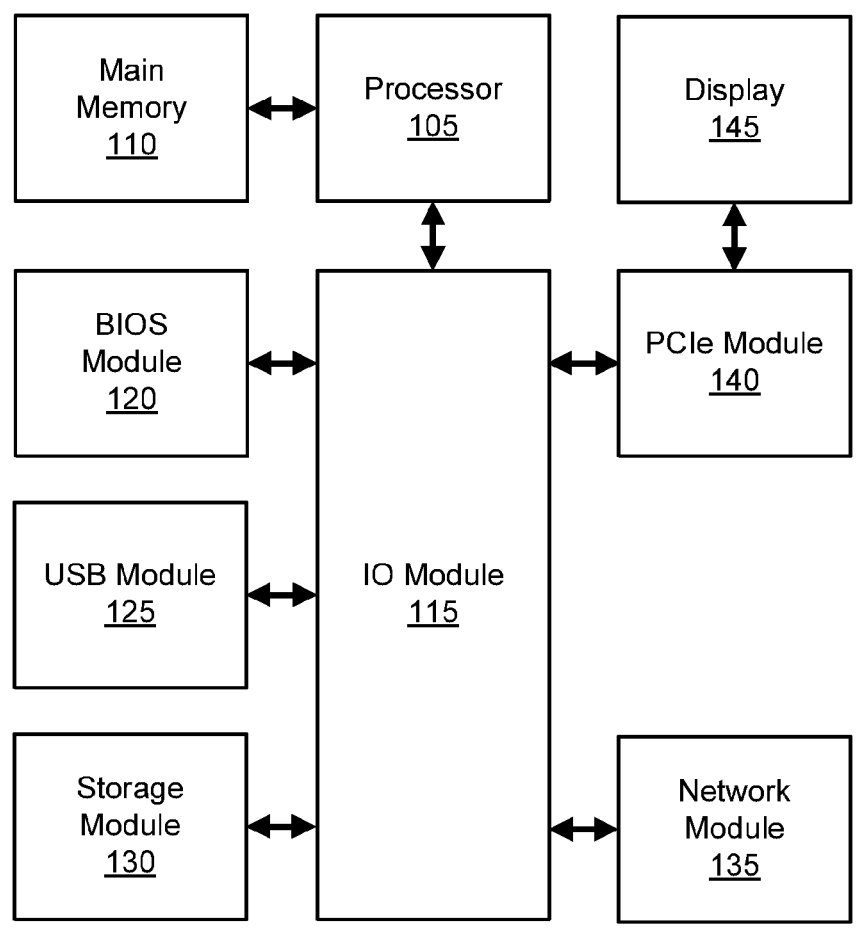
FIG. 1 is a schematic block diagram illustrating one embodiment of an information handling device in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this file, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of an information handling device 100. The information handling device 100 includes a processor 105, a memory 110, an IO module 115, a basic input/output system ("BIOS") module 120, a universal serial bus ("USB") module 125, a storage module 130, a network module 135, a peripheral component interconnect express ("PCIe") module 140, and a display 145. One of skill in the art will recognize that other configurations of an information handling device 100 or multiple information handling devices 100 may be employed with the embodiments described herein.

The processor 105, memory 110, the IO module 115, the BIOS module 120, the USB module 125, the storage module 130, the network module 135, the PCIe module 140, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 130. The storage module 130 may comprise at least one Solid State Device ("SSD"). In addition, the storage module 130 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110.

In addition, the processor 105 may communicate with the IO module 115. The IO module 115 may support and communicate with the BIOS module 120, the network module 135, the PCIe module 140, and the storage module 130.

The PCIe module 140 may communicate with the IO module 115 for transferring data or power to peripheral devices. The PCIe module 140 may include a PCIe bus for attaching the peripheral devices. The PCIe bus can logically connect several peripheral devices over the same set of connections. The peripherals may be selected from a printer, a scanner, or the like. The PCIe module 140 may also comprise an expansion card as is well known to those skilled in the art. In one embodiment, the PCIe module 140 is in communication with a display. Specifically, in one embodiment, the PCIe module comprises a PCIe expansion card in communication with the display. In one embodiment, the PCIe expansion card comprises a PCIe Mini Card. The display 145 may be a cathode ray tube ("CRT"), a liquid crystal display ("LCD") monitor, or the like.

The BIOS module 120 may communicate instructions through the IO module 115 to boot the information handling device 100, so that computer readable software instructions stored on the storage module 130 can load, execute, and assume control of the information handling device 100. The BIOS module 120 may comprise a coded program embedded on a chipset that recognizes and controls various devices that make up the information handling device 100. The BIOS module 120 may refer to various approaches to providing a firmware interface for booting an information handling device 100, including traditional BIOS, unified extensible firmware interface (UEFI), Open Firmware, and others. The BIOS module 120, in one embodiment, includes a storage device that stores the relevant instructions for booting. The storage device may be a solid state storage device, such as Flash memory. The BIOS module 120 may be a solid state storage device with relevant code that is attached to a motherboard of the information handling device 100.

The network module 135 may communicate with the IO module 115 to allow the information handling device 100 to communicate with other devices over a network. The devices may include routers, bridges, computers, printers, and the like. The USB module 125 may communicate with one or more USB compatible devices over a USB bus.

Figure 2:
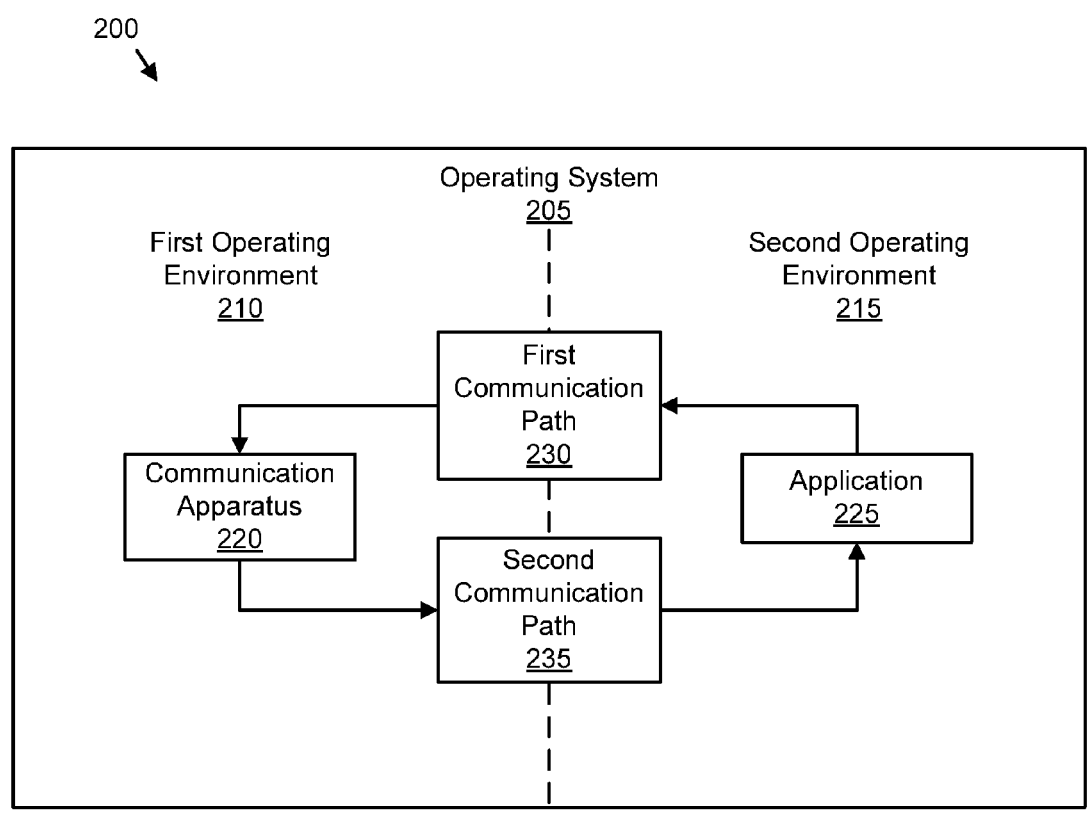
FIG. 2 is a schematic block diagram illustrating one embodiment of a system for communicating between a first operating environment and a second operating environment in an operating system in accordance with the present subject matter.

FIG. 2 depicts one embodiment of a system 200 for communicating between a first operating environment and a second operating environment in an operating system. The system 200 includes an operating system 205 with a first operating environment 210 and a second operating environment 215. The operating system 205 includes first and second communication paths 230, 235. The first operating environment 210 includes a communication apparatus 220 and the second operating environment 215 includes an application 225.

The operating system 205 manages software and hardware resources of an information handling device as is known in the art. The operating system 205 may perform virtual memory management and memory allocation, may support networking, may provide a file system, and the like. In one embodiment, the operating system 205 is an operating system 205 with a desktop environment as a first operating environment 210 and touch-input enabled environment as a second operating environment 215. In one embodiment, the operating system 205 is a Windows® operating system as described below. The Windows® operating system may be a Windows® 8 or later edition operating system that includes a Modern UI operating environment and a desktop environment as described below.

The information handling device may include memory, a storage device storing computer readable programs, and a processor that executes the computer readable programs as is known to those skilled in the art. The information handling device may include at least a portion of the components of the information handling device 100 depicted in FIG. 1. For example, executable code of the operating system 205 may be stored on the storage module, loaded in memory, and executed by the processor. The information handling device may be a portable or handheld device such as a personal desktop assistant ("PDA"), a tablet computer, a slate computer, an e-Book reader, a mobile phone, a smartphone, and the like. In one embodiment, the information handling device may be a desktop computer, a portable computer, a laptop computer, a server, a mainframe computer, and the like.

The operating system 205 includes a first operating environment 210. The first operating environment 210, in one embodiment, is a desktop environment. The desktop environment may be an operating environment having a desktop-style graphical user interface. The desktop-style graphical user interface may include icons for files, folders, programs, and the like. In one embodiment, the desktop environment is a desktop environment provided by a Windows® 8 or later edition operating system as described above.

The operating system 205 includes a second operating environment 215. The second operating environment 215 may be an operating environment having characteristics suited for mobile applications. For example, the second operating environment 215 may be a touch-input enabled environment and may have a graphical user interface with simplified tiles representing applications. In one embodiment, the second operating environment 215 is a Modern UI environment provided by a Windows® 8 or later edition operating system as described above. The Modern UI environment may also be known as a Metro environment, a Modern UI Style environment, and the like. The graphical user interface may incorporate the Modern UI (also known as Metro) design language.

In one embodiment, the operating system 205 switches between a first operating environment mode and a second operating environment mode. For example, in the first operating environment mode, the operating system 205 may primarily execute the first operating environment 210 and in the second operating environment mode, the operating system 205 may primarily execute the second operating environment 215. In one embodiment, when the operating system 205 is primarily executing the second operating environment 215, certain processes, threads, functionality, and the like, of the first operating environment 210 may continue running in the background of the operating system 205. In one embodiment, when the operating system 205 is primarily executing the second operating environment 215, the operating system 205 one or more of displays the graphical user interface of the second operating environment 215, executes and/or is able to execute applications of the second operating environment 215, and devotes greater resources to the second operating environment 215 in comparison with the first operating environment 210. The operating system 205 may also allow a user to switch between the first and second operating environment modes.

As depicted, one or more applications 225 execute in the second operating environment 215. In one embodiment, applications executing in one or more of the first operating environment 210 and the second operating environment 215 are operating environment-specific, meaning that, without customization, applications of the second operating environment 215 do not execute in the first operating environment 210 and applications of the first operating environment 210 do not execute in the second operating environment 215. In one embodiment, the application 225 is a Windows® Modern UI application, which may also be referred to as a Modern UI Style application, a Metro Application, and the like.

In some embodiments, the first operating environment 210 has greater access to certain types of information of the operating system 205 and hardware of the information handling device. For example, the first operating environment 210, as described above, may be a desktop environment with access to hardware information, system information, driver information, the registry, and the like. In one embodiment, communication is limited from applications 225 executing in the second operating environment 215 with the first operating environment 210. For example, in certain embodiments, device drivers may allow for some communication from the first operating environment 210 with a limited number of applications running in the second operating environment 215. However, device drivers are typically used for hardware communication, not software inter-process communication. Furthermore, the operating system 205, in some embodiments, may provide for communication between the first and second operating environments 210, 215 with network communication. However, a web service may be needed to enable network communication.

Therefore, the operating system 205 includes a communication apparatus 220 to one or more of facilitate, enable, and manage communication between the first and second operating environments 210, 215. The communication apparatus 220 may be embodied as a desktop service, a process, or the like. In one embodiment, the communication apparatus 220 continues to run while the operating system 205 is in second operating environment mode. Although, in the depicted embodiment, a single application 225 is depicted, the second operating environment 215 may include multiple applications communicating with the communication apparatus 220.

Applications 225 running in the second operating environment 215 may communicate, using a first communication path 230, with the communication apparatus 220 running in the first operating environment 210. Moreover, the communication apparatus 220 communicates with applications 225 in the second operating environment 215 using a second communication path 235 different from the first communication path 230. For example, an application 225 may request certain information from the first operating environment 210 using the first communication path 230, and the communication apparatus 220 may communicate the requested information to the application 225 through the second communication path 235. The communication apparatus 220 may enable or disable certain software features on behalf of the application 225, launch an application, launch a web site, perform a network request, and the like, in response to receiving a message from the application 225. The communication apparatus 220 may provide communication for any suitable number of applications 225 executing in the second operating environment 215.

In one embodiment, the communication apparatus 220 continues to run (e.g. as a desktop service) while the operating system 205 is in the second operating environment mode. The communication apparatus 220 may enable communication for the application 225 while the operating system is in the second operating environment mode and the application 225 executes in the second operating environment 215.

The first and second communication paths 230, 235 may be pre-existing communication paths that are part of the operating system 205 and accessible by both of the first and second operating environments 210, 215. In one embodiment, the first communication path 230 is an event tracing tool implemented by the operating system 205. The event tracing tool may be used by the operating system 205 to log and trace events from applications, drivers, and the like. In a further embodiment, the event tracing tool is Event Tracing for Windows (ETW). In one embodiment, the second communication path 235 is a N Uniform Resource Identifier (URI) scheme. A URI is a character string identifying a resource. With a URI scheme, an application 225 may register with the operating system 205 to become the handler for a particular URI scheme name. According to the URI scheme, the application 225 may be launched and/or notified in response to an invocation of the particular URI scheme name. For example, for the URI scheme name "mailto:," an application may open a new e-mail message so that the user can compose an e-mail. One a URI scheme name is registered and associated with the application 225 the communication apparatus 220 may communicate using the URI scheme by invoking the URI scheme name. This would allow the communication apparatus 220 to pass the application 225 a query string with certain information. The communication apparatus 220 may also use the URI scheme to notify the application 225 to check a predetermined file for more information.

Figure 3:
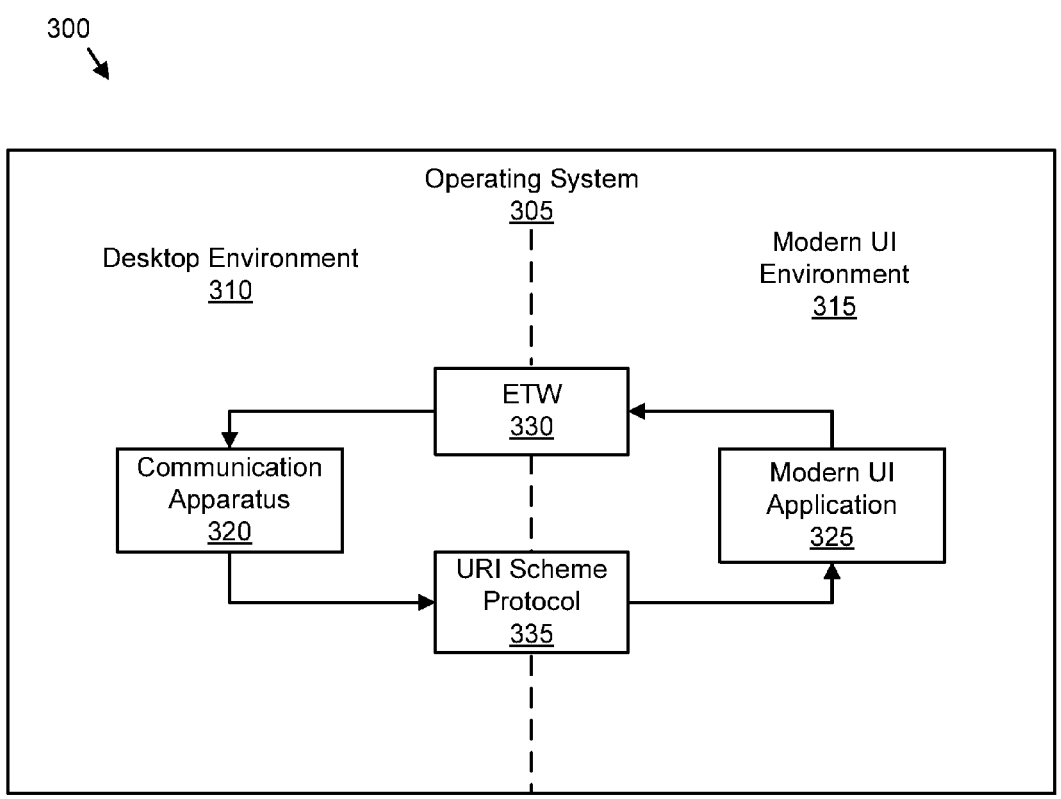
FIG. 3 is a schematic block diagram illustrating another embodiment of a system for communicating between a first operating environment and a second operating environment in an operating system in accordance with the present subject matter.

FIG. 3 depicts another embodiment of a system 300 for communicating between a first operating environment 210 and a second operating environment 215 in an operating system. The system 300 includes an operating system 305 with a desktop environment 310 and a Modern UI environment. The operating system 305, the desktop environment 310, and the Modern UI environment 315, may be embodiments of the operating system 205, the first operating environment 210, and the second operating environment 215 of FIG. 2. The operating system 305 may be a Windows® operating system as described above. The operating system 305 includes Event Tracing for Windows (ETW) 330 and a Uniform Resource Identifier (URI) scheme 335, which may be embodiments of the first and second communication paths 220, 225 from FIG. 2 respectively. The desktop environment 310 includes a communication apparatus 320 and the Modern UI environment 315 includes a Modern UI application 325, which may be embodiments of the communication apparatus 220 and the application 225 of FIG. 2 respectively.

In the system 300 of the depicted embodiment, the first communication path is ETW 330 and the Modern UI application 325 communicates with the communication apparatus 320 using ETW 330. As described below, the communication apparatus 320 may create an ETW session through an operating system Application Programming Interface (API). The communication apparatus 320 may create a listener on the ETW session to be notified of events written to the ETW. The operating system 305 may notify the communication apparatus 320, through the listener, whenever an event is written to the ETW session from the Modern UI application 325.

As described below, in the depicted embodiment, the communication apparatus 320 communicates with the Modern UI application 325 using a URI scheme 335. The Modern UI application 325 may register with the operating system 305 to be the default handler for a particular URI scheme name. The communication apparatus 320 may invoke the URI scheme with the registered URI scheme name for the Modern UI application 325 to notify the Modern UI application 325 that updated information is available.

Figure 4A:
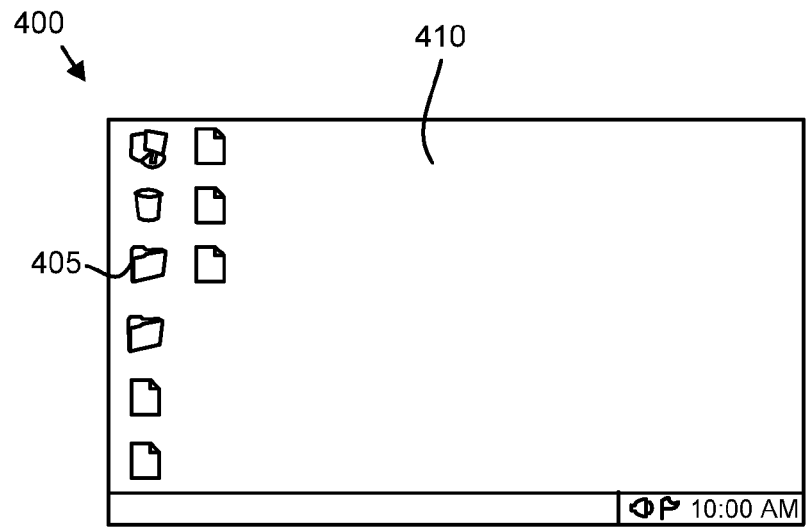
FIG. 4A is a schematic block diagram illustrating one embodiment of a user interface for a first operating environment in accordance with the present subject matter.

FIG. 4A depicts one embodiment of a user interface 400 for a first operating environment 210 in accordance with the present subject matter. Specifically, FIG. 4A depicts one embodiment of a desktop environment user interface 400. The desktop environment user interface 400 may correspond to a user interface of the first operating environment 210 as described above. The desktop environment user interface 400 may, in one embodiment, be for a desktop environment provided by a Windows® 8 or later edition operating system as described above. The desktop environment user interface 400 may include a desktop surface 410 with icons 405 representing files, folders, applications, and the like.

Figure 4B:
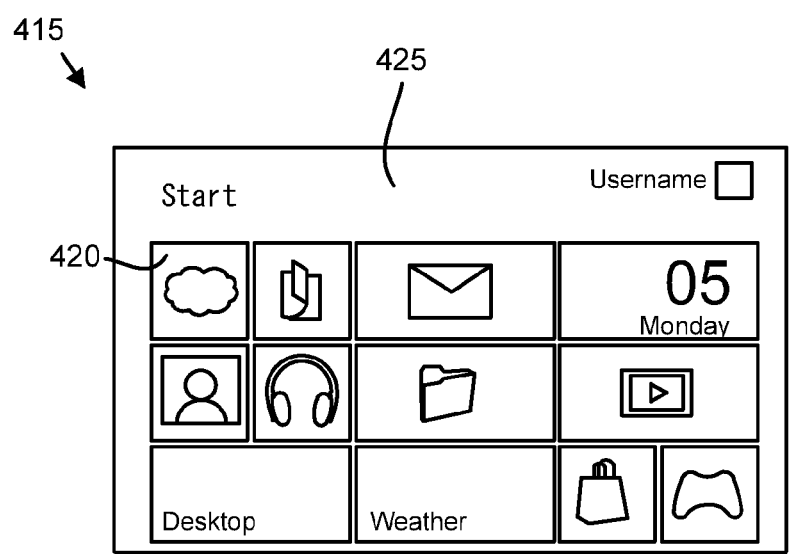
FIG. 4B is a schematic block diagram illustrating one embodiment of a user interface for a second operating environment in accordance with the present subject matter.

FIG. 4B depicts one embodiment of a user interface 415 for a second operating environment 215 in accordance with the present subject matter. Specifically, FIG. 4B depicts one embodiment of a Modern UI environment user interface 415. The Modern UI environment user interface 415 may have characteristics suited for mobile applications and may be a touch enabled user interface. In the depicted embodiment, the Modern UI environment user interface 415 includes a "start screen" 425 having simplified tiles 420 representing applications. In one embodiment, the Modern UI environment user interface 415 provided by a Windows® 8 or later edition operating system as described above.

Figure 5:
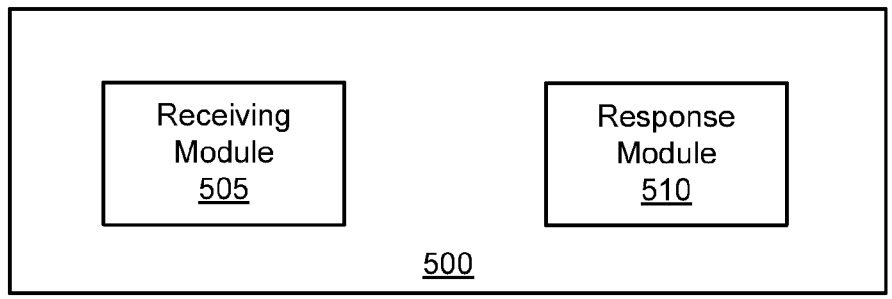
FIG. 5 is a schematic block diagram illustrating one embodiment of an apparatus for communicating between a first operating environment and a second operating environment in an operating system in accordance with the present subject matter.

FIG. 5 depicts one embodiment of an apparatus 500 for communicating between a first operating environment 210 and a second operating environment 215 in an operating system 205 in accordance with the present subject matter. The apparatus 500 may comprise one embodiment of the communication apparatus 230 depicted in one or more of FIG. 2 and FIG. 3. The apparatus 500 includes a receiving module 505 and a response module 510. As used in connection with FIGS. 5-9, the term "application" refers to one or more applications 225, such as Modern UI applications, executing in the second operating environment 215 as described above.

The receiving module 505, in one embodiment, receives a request in a first operating environment 210 from an application 225 executing in a second operating environment 215. The first and second operating environments 210, 215 may be provided by a common operating system 205 as described above. The operating system 205 may be in a second operating environment mode when the receiving module 505 receives the request. For example, the operating system 205 may be displaying a graphical user interface of the second operating environment 215, may be executing applications 225 of the second operating environment 215, and the like, while the operating system 205 is in the second operating environment mode.

In one embodiment, the request includes one or more information identifiers. The information identifiers may specify information to send to the application 225. In one embodiment, the information identifiers may specify a particular type of information. The request may subscribe the application 225 to receive information of the particular type in the future without the application 225 having to initiate any future contact with the receiving module 505. The particular types of information requested by the application may include, but is not limited to, driver information, hardware information, registry information, serial numbers, and the like. In one embodiment, the request includes a unique identifier for the application such as a Global Unique Identifier (GUID).

The request may also include a Uniform Resource Identifier (URI) scheme identifier. The URI scheme identifier may identify a URI scheme associated with the application. For example, the URI scheme identifier may identify a particular URI scheme name to which the application 225 is registered.

The request may be communicated through a first communication path 230. In one embodiment, the first communication path 230 is a one-way communication path from the second operating environment 215 to the first operating environment 210. As described above, the first communication path 230 may be an event tracing tool implemented by the operating system 205, such as Event Tracing for Windows (ETW). The receiving module 505 may start an ETW session through an operating system Application Programming Interface (API) and allow applications 225 having certain predetermined unique identifiers (e.g. the GUID of the application 225) to have access to ETW to log events. The receiving module 505 may create a listener on this ETW session. The application 225 may send a request using ETW by writing an event to ETW. The operating system 205 may notify the receiving module 505, through the listener, when the event is written to ETW and the receiving module 505 may receive the request by obtaining the event from the listener on the ETW session. In one embodiment, the receiving module 505 is notified of each event written to ETW and the receiving module 505 may parse the events and search for events from applications 225 executing in the second operating environment 215. In other embodiments, the receiving module 505 is notified of events written by applications 225.

The response module 510, in one embodiment, sends a response from the first operating environment 210 to the application 225 in the second operating environment 215 through a second communication path 235 distinct from the first communication path 230. In one embodiment, the second communication path 235 is a Uniform Resource Identifier (URI) scheme as described above. A message sent according to the URI scheme may include the URI scheme name and a query having one or more parameters. If the application 225 has registered with the operating system 205 for a particular URI scheme name, any message sent to the URI scheme name with a URI scheme will be directed by the operating system 205 to the associated application 225.

The response module 510 may determine the information requested from the request, obtain the information, and send the response accordingly. The response module 510 may send a single response to a request from the application 225, or as described below, may send recurring messages with requested information in response to the application 225 being registered to receive certain information.

The application 225, in one embodiment, registers with the operating system 205 to be the default handler for a particular URI scheme name. The application 225 may pass the URI scheme name in the initial request to the receiving module 505 as described above. Consequently, the response module 510 may send the response to the application using the URI scheme by invoking the URI scheme using the URI scheme name. The response module 510 may pass a certain amount of parameters to the application in the query of the URI scheme message.

To communicate more information than that allowed by the parameters in the URI scheme, the response module 510 may create and maintain information for the application 225 in a file which the application 225 may access. The application 225 may check the file in response to the response module 510 using the URI scheme with the URL of the application 225. The file may be located in a predetermined location known by the application 225 according to a policy. For example, the response module 510 may create a folder in the file system that is named according to the unique identifier of the application 225 and the policy may specify that the application 225 will access the file from a folder named according to the unique identifier. Thus, the response may indicate the requested information, whether in one or more of the URI scheme message parameters and in the associated file.

The response module 510 may communicate, through one or more of the parameters in the URI scheme query and the file, the information requested by the application 225 such as hardware information, driver information, passwords, serial numbers, authentication information, registry information, and the like. In one embodiment, the response module 510 communicates information related to Windows® Active Directory which manages security and authentication. For example, in one embodiment, the application 225 registers to receive certain information such as registry changes, file changes, operating system notification, and the like. The response module 510 may monitor the registry, the files, the operating system, and the like, for changes. When a change occurs, the response module 510 may communicate to the application 225 with information on the changes.

After sending a request, the application 225 may be configured to run synchronously and wait for the response from the response module 510 to be received, or the application 225 may run asynchronously without waiting for the response. When the application 225 receives the response, the application 225 may then process the message content of the response and act accordingly, such as referencing the file, obtaining information from the parameters in the URI scheme message, and the like. The application may ignore the response or use it as a means of synchronization to know when the initial request was completed.

Figure 6:
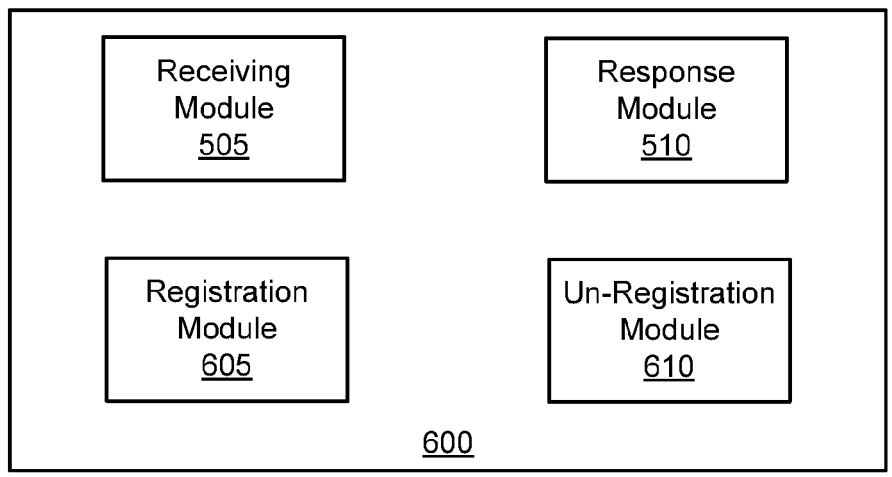
FIG. 6 is a schematic block diagram illustrating another embodiment of an apparatus for communicating between a first operating environment and a second operating environment in an operating system in accordance with the present subject matter.

FIG. 6 depicts another embodiment of an apparatus 600 for communicating between a first operating environment 210 and a second operating environment 215 in an operating system 205 in accordance with the present subject matter. The apparatus 600 includes the receiving module 505 and the response module 510, wherein these modules are substantially similar to the like named modules described above in relation to FIG. 5. Furthermore, the apparatus 600 includes a registration module 605 and an un-registration module 610.

The registration module 605, in one embodiment, registers an application 225 in response to the receiving module 505 receiving a request from the application 225. The registration module 605 may register the application 225 by associating the URI scheme with the application 225 and by identifying information to communicate to the application of the particular type. For example, the registration module 605 may maintain a record of one or more applications 225 with information such as the application's unique identifier, the URI scheme name associated with the application, particular types of information requested by the application, and the like. Responses communicated by the response module 510 may indicate information requested by the application.

By requesting certain types of information, an application 225 may "subscribe" to this information and the response module 510 may communicate the requested information as it becomes available. The registration module 605 may record registration information of the applications 225 in a file, the registry, and the like. The registration may persist across device restarts.

The un-registration module 610, in one embodiment, un-registers the application 225 in response to the receiving module 505 receiving an un-registration request from the application 225. The response module 510 may discontinue sending information of the particular type to the application 225 in response to the un-registration module 610 un-registering the application 225. Un-registering a particular application 225 may include deleting information for that application 225 from the record stored by the registration module 605, maintaining the information but indicating that the application 225 is inactive, and the like.

Figure 7:
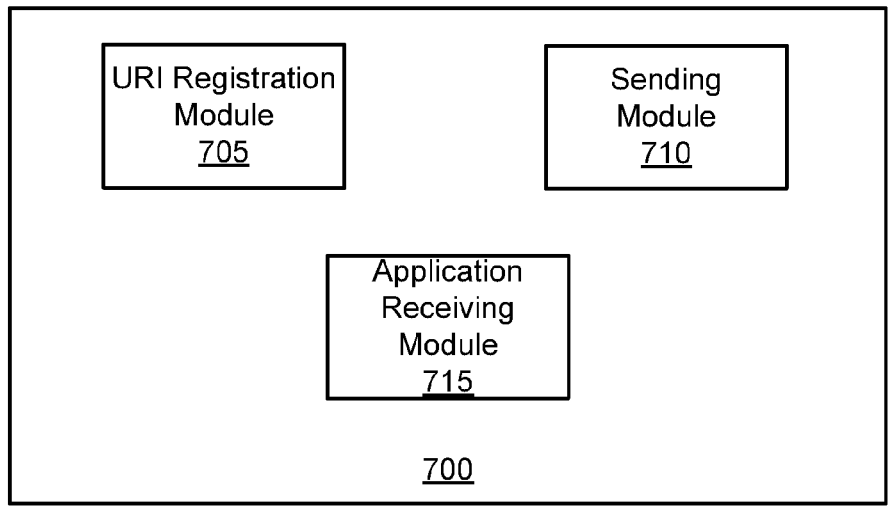
FIG. 7 is a schematic block diagram illustrating yet another embodiment of an apparatus for communicating between a first operating environment and a second operating environment in an operating system in accordance with the present subject matter.

FIG. 7 depicts yet another embodiment of apparatus 700 for communicating between a first operating environment 210 and a second operating environment 215 in an operating system 205 in accordance with the present subject matter. The apparatus 700 may be part of an application 225 executing in the second operating environment 215. For example, the apparatus 700 may be embodied as code executed by the application 225. The apparatus 700 includes a URI registration module 705, a sending module 710, and an application receiving module 715.

The URI registration module 705, in one embodiment, registers an application 225 with the operating system 205 to become the handler for a particular URI scheme name. This registration may allow the communication apparatus 220 to pass URI scheme messages to the application 225 and to notify the application 225 to check a predetermined file for more information.

The sending module 710, in one embodiment, sends a request to the communication apparatus 220. The request may include one or more information identifiers, a GUID associated with the application 225, a URI scheme identifier such as a URI scheme name, and the like, as described above. The sending module 710 may send a request using ETW as described above. For example, the sending module 710 may write an event to ETW using an API provided by the operating system 205.

The application receiving module 715, in one embodiment, receives a response from the communication apparatus 220. In one embodiment, the response may include requested information. In one embodiment, the response may notify the application receiving module 715 to check the predetermined file for the requested information as described above.

Figure 8:
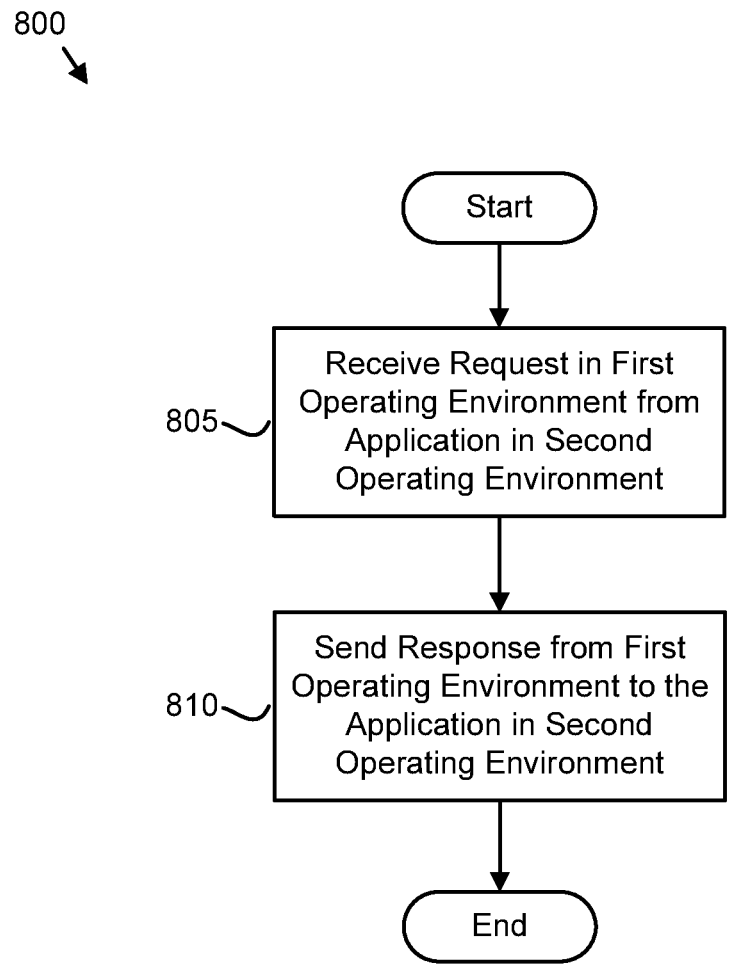
FIG. 8 is a schematic flow chart diagram illustrating one embodiment of a method for communicating between a first operating environment and a second operating environment in an operating system in accordance with the present subject matter.

FIG. 8 depicts one embodiment of a method 800 for communicating between a first operating environment 210 and a second operating environment 215 in an operating system 205 in accordance with the present subject matter. The method 800 begins and the receiving module 505 receives a request in a first operating environment 210 from an application 225 executing in a second operating environment 215. The first and second operating environments 210, 215 may be provided by a common operating system 205. The request may be communicated through a first communication path 230. The response module 510 sends 810 a response from the first operating environment 210 to the application 225 in the second operating environment 215 through a second communication path 235 distinct from the first communication path 230. Then the method 800 ends.

Figure 9:
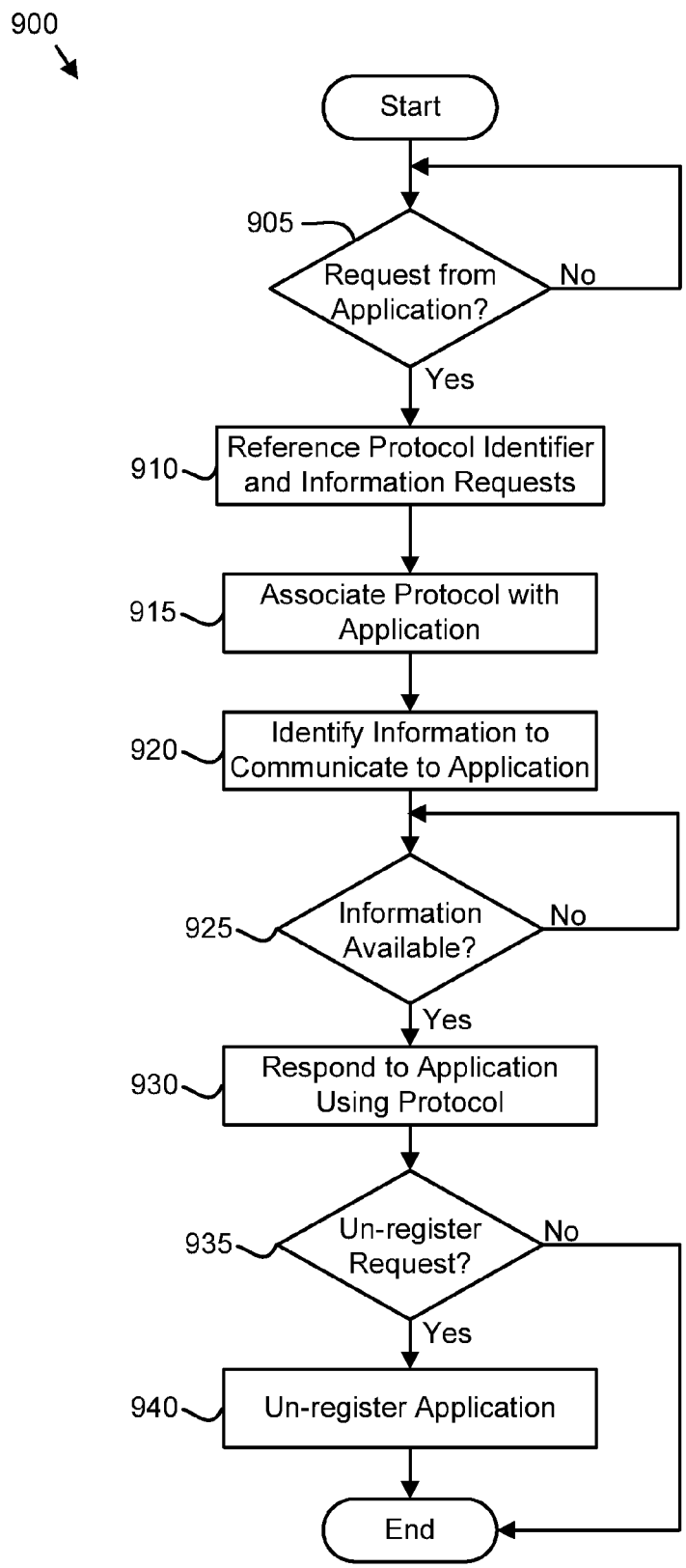
FIG. 9 is a schematic flow chart diagram illustrating another embodiment of a method for communicating between a first operating environment and a second operating environment in an operating system in accordance with the present subject matter.

FIG. 9 depicts another embodiment of a method 900 for communicating between a first operating environment 210 and a second operating environment 215 in an operating system 205 in accordance with the present subject matter. The method 900 begins and the receiving module 505, executing in a first operating environment 210, monitors 905 for a request from an application 225 executing in a second operating environment 215. If the receiving module 505 does not receive 905 a request from an application 225, the receiving module 505 continues to monitor 905 for a request. If the receiving module 505 receives 905 a request from an application 225, the registration module 605 references 910 the protocol identifier and the one or more information identifiers from the request. The registration module 605 associates 915 a URI scheme with the application 225 as identified by the protocol identifier.

The registration module 605 identifies 920 the particular type of information for communication to the application 225 based on the one or more information identifiers. The response module 510 monitors 925 for information of the particular type. For example, the response module 510 may monitor the registry for registry changes or a certain file for file changes. If the response module 510 does not detect 925 information of the particular type, the response module 510 continues to monitor 925 for the information. If the response module 510 detects 925 information of the particular type, the response module 510 responds 930 to the application 225 with the information. The response module 510 responds using the URI scheme.

If the un-registration module 610 does not receive 935 an un-registration request, the method 900 ends. If the un-registration module 610 receives 935 an un-registration request, the un-registration module 610 unregisters 940 the application and the method 900 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a storage device comprising machine-readable code;
   a processor that executes the machine-readable code, the machine-readable code comprising:
   a receiving module that receives a request in a first operating environment from an application executing in a second operating environment, the first and second operating environments provided by a common operating system, the request comprising one or more information identifiers requesting a particular type of information from the first operating environment, wherein the request is communicated through a first communication path comprising a one-way communication path from the second operating environment to the first operating environment; and
   a response module that sends a response indicating information of the particular type from the first operating environment to the application in the second operating environment through a second communication path distinct from the first communication path.

2. The apparatus of claim 1, wherein the first operating environment comprises a desktop environment and wherein the second operating environment comprises a touch-input enabled environment.

3. The apparatus of claim 2, wherein the second operating environment comprises a graphical user interface with simple tiles representing applications.

4. The apparatus of claim 1, wherein the first communication path comprises an event tracing tool implemented by the operating system.

5. The apparatus of claim 4, wherein the event tracing tool comprises Event Tracing for Windows (ETW).

6. The apparatus of claim 1, wherein the request comprises a global unique identifier that uniquely identifies the application in the second operating environment, wherein the response module maintains information of the particular type in a file accessible by the application, the file located in a predetermined location based on the global unique identifier of the application.

7. The apparatus of claim 1, wherein the second communication path comprises a Uniform Resource Identifier (URI) scheme.

8. The apparatus of claim 1, wherein the request comprises a Uniform Resource Identifier (URI) scheme identifier, the URI scheme name identifying a URI scheme associated with the application.

9. The apparatus of claim 8, further comprising a registration module that registers the application in response to the receiving module receiving the request, wherein the registration module registers the application by associating the URI scheme with the application and identifying information to communicate to the application of the particular type.

10. The apparatus of claim 8, further comprising a un-registration module that unregisters the application in response to the receiving module receiving an un-registration request from the application, the response module discontinuing sending information of the particular type to the application in response to the un-registration module unregistering the application.

11. A method comprising:
    receiving a request in a first operating environment from an application executing in a second operating environment, the first and second operating environments provided by a common operating system, the request comprising one or more information identifiers requesting a particular type of information from the first operating environment, wherein the request is communicated through a first communication path;
    monitoring for information in the first operating environment corresponding to the particular type of information; and
    sending a response comprising information of the particular type from the first operating environment to the application in the second operating environment through a second communication path distinct from the first communication path.

12. The method of claim 11, wherein the first operating environment comprises a desktop environment and wherein the second operating environment comprises a touch-input enabled environment.

13. The method of claim 12, wherein the second operating environment comprises a graphical user interface with simple tiles representing applications.

14. The method of claim 11, wherein the first communication path comprises an event tracing tool implemented by the operating system, wherein the event tracing tool comprises Event Tracing for Windows (ETW), wherein the first communication path comprises a one-way communication path from the second operating environment to the first operating environment, and wherein the second communication path comprises a Uniform Resource Identifier (URI) scheme.

15. The method of claim 14, further comprising registering the application in response to receiving the request, wherein the application is registered by associating the URI scheme with the application.

16. A computer program product comprising a storage device storing machine readable code executed by a processor to perform the operations of:
    receiving a request in a first operating environment from an application executing in a second operating environment, the first and second operating environments provided by a common operating system, the request comprising one or more information identifiers requesting a particular type of information from the first operating environment, wherein the request is communicated through a first communication path;
    identifying information of the particular type in the first operating environment; and
    sending a response indicating the identified information of the particular type from the first operating environment to the application in the second operating environment through a second communication path distinct from the first communication path.

17. The computer program product of claim 16, wherein the first operating environment comprises a desktop environment and wherein the second operating environment comprises a touch-input enabled environment.

18. The computer program product of claim 16, wherein the second operating environment comprises a graphical user interface with simple tiles representing applications.

19. The computer program product of claim 16, wherein the first communication path comprises an event tracing tool implemented by the operating system, wherein the event tracing tool comprises Event Tracing for Windows (ETW), wherein the first communication path comprises a one-way communication path from the second operating environment to the first operating environment, and wherein the second communication path comprises a Uniform Resource Identifier (URI) scheme.

20. The computer program product of claim 19, wherein the operations further comprise registering the application in response to receiving the request, wherein the application is registered by associating the URI scheme with the application.

* * * * *